United States Patent
Best et al.

(10) Patent No.: US 9,910,746 B2
(45) Date of Patent: *Mar. 6, 2018

(54) STORAGE DEVICE WITH ERROR RECOVERY INDICATION

(71) Applicant: INTERNATIONAL BUSINESS MACHINES CORPORATION, Armonk, NY (US)

(72) Inventors: Steven F. Best, Groton, MA (US); Janice M. Girouard, Austin, TX (US); Robert E. Reiland, Raleigh, NC (US); Yehuda Shiran, Haifa (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/799,096

(22) Filed: Jul. 14, 2015

(65) Prior Publication Data

US 2015/0317201 A1    Nov. 5, 2015

Related U.S. Application Data

(63) Continuation of application No. 13/899,401, filed on May 21, 2013, now Pat. No. 9,317,382.

(51) Int. Cl.
*G06F 11/00* (2006.01)
*G06F 11/20* (2006.01)
(Continued)

(52) U.S. Cl.
CPC ........ *G06F 11/2053* (2013.01); *G06F 3/0619* (2013.01); *G06F 3/0644* (2013.01);
(Continued)

(58) Field of Classification Search
CPC ............. G06F 11/2053; G06F 11/2056; G06F 11/0727; G06F 11/0793; G06F 11/073; G06F 3/0676; G06F 3/0619; G06F 3/0644
(Continued)

(56) References Cited

U.S. PATENT DOCUMENTS 5,680,539 A    10/1997  Jones
6,078,454 A     6/2000  Takahashi et al.
(Continued)

FOREIGN PATENT DOCUMENTS

WO    9934291 A1    7/1999

OTHER PUBLICATIONS

Park et al., "Real-time Disk Scheduling Techniques for Mirrored Disk Systems," Proceedings of 1994 IEEE Region 10's Ninth Annual International Conference, Theme: Frontiers of Computer Technology, TENCON'94, pp. 474-480, IEEE, 1994.

*Primary Examiner* — Yair Leibovich
(74) *Attorney, Agent, or Firm* — Griffiths & Seaton PLLC

(57) ABSTRACT

Various embodiments are provided that enable a controller of a storage device having storage media to perform one or more error recovery operations on the storage media, and to convey, while performing the one or more error recovery operations, a message indicating a status of the one or more error recovery operations to a host processor in communication with the storage device. Storage devices implementing embodiments of the present invention include hard disk drives and solid state disk drives comprising a disk head having a magnetoresistive (MR) element configured to read and write data to and from the storage media, and coupled to an analog/digital (A/D) converter, and the error recovery operations are selected from a list of changing an automatic gain control of the A/D converter, positioning the disk head
(Continued)

off-track in order to read the data, and adjusting a bias value of the MR element.

15 Claims, 3 Drawing Sheets

(51) Int. Cl.
G06F 11/07 (2006.01)
G06F 3/06 (2006.01)

(52) U.S. Cl.
CPC .......... *G06F 3/0676* (2013.01); *G06F 11/073* (2013.01); *G06F 11/0727* (2013.01); *G06F 11/0793* (2013.01); *G06F 11/2056* (2013.01)

(58) Field of Classification Search
USPC ........................................ 714/6.11
See application file for complete search history.

(56) References Cited

U.S. PATENT DOCUMENTS

| | | | |
|---|---|---|---|
| 6,859,890 B2 | 2/2005 | Humlicek et al. | |
| 6,880,052 B2 | 4/2005 | Lubbers et al. | |
| 7,050,252 B1 | 5/2006 | Vallis | |
| 7,363,399 B2 | 4/2008 | Shum et al. | |
| 7,522,365 B1* | 4/2009 | Chen | G11B 5/012 360/31 |
| 7,730,153 B1 | 6/2010 | Gole et al. | |
| 7,917,903 B2 | 3/2011 | Lumb et al. | |
| 8,116,025 B1 | 2/2012 | Chan et al. | |
| 8,804,260 B2 | 8/2014 | Mathew et al. | |
| 8,935,215 B1 | 1/2015 | Sharma | |
| 9,317,382 B2* | 4/2016 | Best | G06F 11/2053 |
| 2002/0067676 A1* | 6/2002 | Inokuchi | G11B 7/005 369/59.15 |
| 2004/0093551 A1* | 5/2004 | Asano | G11B 19/04 714/765 |
| 2004/0156138 A1* | 8/2004 | Yun | G11B 19/04 360/53 |
| 2006/0218360 A1 | 9/2006 | Burkey | |
| 2007/0002482 A1 | 1/2007 | Daikokuya et al. | |
| 2007/0053094 A1* | 3/2007 | Kitamura | G11B 20/18 360/53 |
| 2008/0147920 A1 | 6/2008 | Mohan et al. | |
| 2010/0011371 A1 | 1/2010 | Burkey | |
| 2010/0275057 A1 | 10/2010 | Durica et al. | |
| 2011/0191628 A1 | 8/2011 | Noguchi et al. | |
| 2011/0246677 A1 | 10/2011 | Johnson et al. | |
| 2013/0173558 A1* | 7/2013 | Whisenant | G06F 11/0793 707/674 |

\* cited by examiner

STORAGE DEVICE WITH ERROR RECOVERY INDICATION

CROSS-REFERENCE TO RELATED APPLICATIONS

This application is a Continuation of U.S. patent application Ser. No. 13/899,401, filed on May 21, 2013, which is related to U.S. patent application titled "Minimizing Delay Periods When Accessing Disk Pairs in a Storage System", filed on even date, both of which are incorporated herein by reference.

FIELD OF THE INVENTION

The present invention relates generally to storage devices, and specifically to a storage device configured to convey an error recovery status.

BACKGROUND

Subsequent to processing input/output (I/O) requests over a period of time, a storage device (e.g., a hard disk) may detect problems such as adjacent track interference, which can impact the reliability of data stored on the storage device. Adjacent track interference can occur if a particular track of the storage device is written a large number of times (e.g., 30,000 times or more) without writing to any adjacent tracks. The large number of writes on the particular track may cause some magnetic flux interference on the adjacent tracks that, over many write cycles, can accumulate and leave the adjacent tracks unreadable. In other words, data stored on the adjacent tracks can become corrupted due to adjacent track interference. Various techniques for detecting and correcting storage device problems such as adjacent track interference are known in the art.

The description above is presented as a general overview of related art in this field and should not be construed as an admission that any of the information it contains constitutes prior art against the present patent application.

SUMMARY

There is provided, in accordance with an embodiment of the present invention an apparatus, including storage media configured to store data, and a controller having a controller processor configured to perform one or more error recovery operations on the storage media, and to convey, while performing the one or more error recovery operations, a message indicating a status of the one or more error recovery operations to a host processor in communication with the storage device; the storage device comprising a disk head having a magnetoresistive (MR) element configured to read and write data to and from the storage media, and coupled to an analog/digital (A/D) converter, and wherein the one or more error recovery operations are selected from a list comprising changing an automatic gain control of the A/D converter, positioning the disk head off-track in order to read the data, and adjusting a bias value of the MR element.

There is also provided, in accordance with an embodiment of the present invention a method, including performing, by a storage device having storage media, one or more error recovery operations on the storage media, and conveying, while performing the one or more error recovery operations, a message indicating a status of the one or more error recovery operations to a host processor in communication with the storage device; the storage device comprising a disk head having a magnetoresistive (MR) element configured to read and write data to and from the storage media, and coupled to an analog/digital (A/D) converter, and wherein the one or more error recovery operations are selected from a list comprising changing an automatic gain control of the A/D converter, positioning the disk head off-track in order to read the data, and adjusting a bias value of the MR element.

There is further provided, in accordance with an embodiment of the present invention a computer program product, the computer program product including a non-transitory computer readable storage medium having computer readable program code embodied therewith, the computer readable program code including computer readable program code configured to perform, by a storage device having storage media, one or more error recovery operations on the storage media, and computer readable program code configured to convey, while performing the one or more error recovery operations, a message indicating a status of the one or more error recovery operations to a host processor in communication with the storage device; the storage device comprising a disk head having a magnetoresistive (MR) element configured to read and write data to and from the storage media, and coupled to an analog/digital (A/D) converter, and wherein the one or more error recovery operations are selected from a list comprising changing an automatic gain control of the A/D converter, positioning the disk head off-track in order to read the data, and adjusting a bias value of the MR element.

BRIEF DESCRIPTION OF THE DRAWINGS

The disclosure is herein described, by way of example only, with reference to the accompanying drawings, wherein.

DETAILED DESCRIPTION OF EMBODIMENTS

When a storage device detects a problem such as adjacent track interference, the storage device can enter an "error recovery mode", and execute one or more error recovery operations to correct the problem. While the storage device is in an error recovery mode, the storage device may receive, from a host processor, a request to perform an input/output (I/O) operation, and upon receiving the I/O request, the storage device can queue the I/O request. Once the storage device completes executing the one or more error recovery operations and exits the error recovery mode, the storage device can then process the queued I/O request.

While waiting for completion of an I/O request conveyed to a storage device that is currently in an error recovery mode, a host processor may not receive any indication that the storage device is in an error recovery mode. In other words, the host processor cannot determine if the storage device is not responding to the I/O request due to a storage device failure or due to the storage device performing one or more error recovery operations.

Embodiments of the present invention provide methods and systems for a storage device in an error recovery mode to convey a status of the error recovery mode to the host processor. The storage device may comprise storage media and a controller having a processor configured to perform one or more error recovery operations on the storage media, and to convey, while performing the one or more error recovery operations, a message indicating a status of the one or more error recovery operations to the host processor.

In some embodiments, upon receiving an I/O request from a host processor while performing an error recovery operation, the controller can be configured to convey a message to the host processor indicating that the storage device is in an error recovery mode. In alternative embodiments, upon initiating one or more error recovery operations, the controller can be configured to broadcast a first message to the host processor indicating that the storage device is in an error recovery mode, and upon completion of the one or more error recovery operations, the controller can broadcast a second message to the host processor indicating that the storage device is no longer in the error recovery mode.

Figure 1:
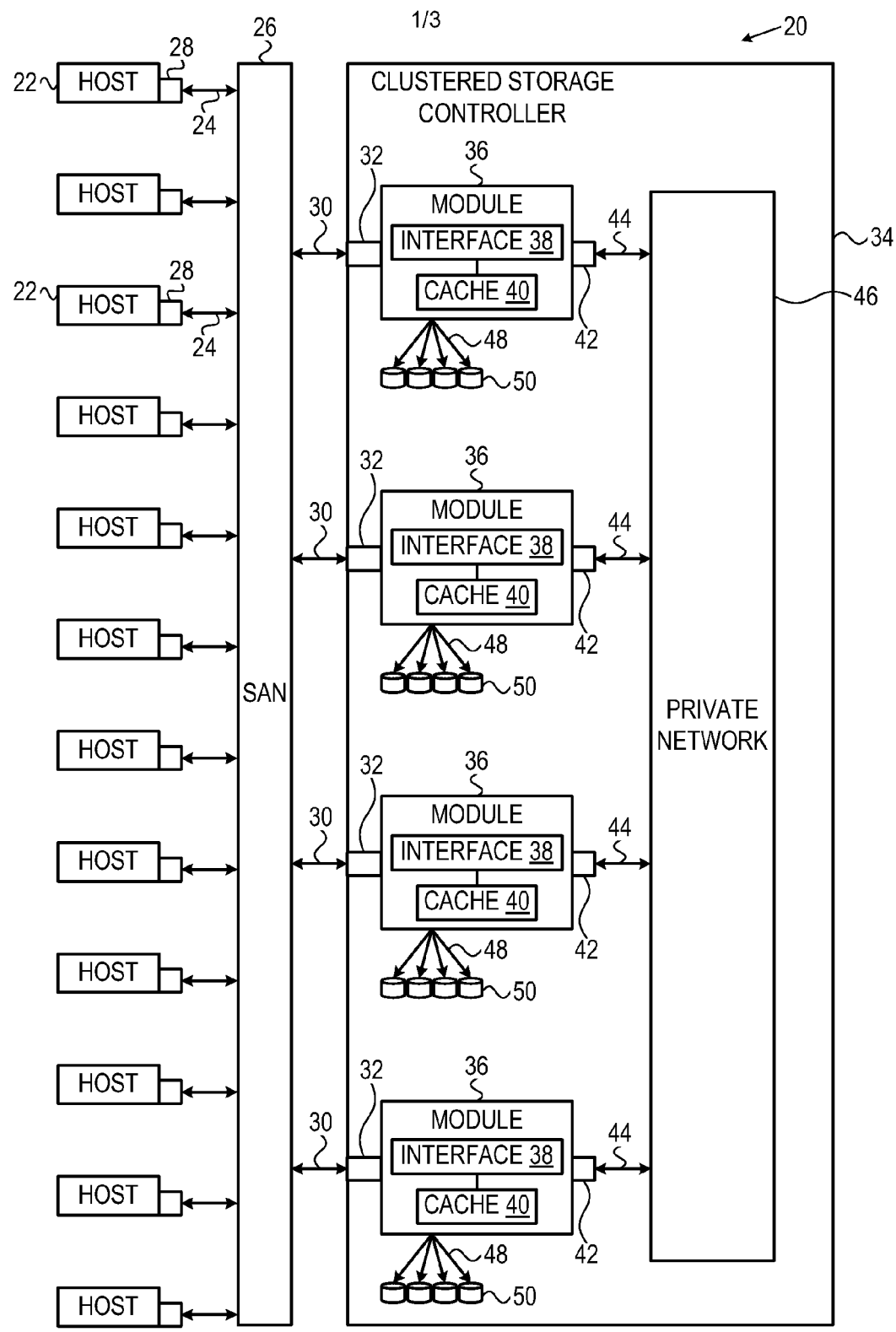
FIG. 1 is a block diagram that schematically illustrates a storage system, in accordance with an embodiment of the present invention.

FIG. 1 is a block diagram that schematically illustrates a data processing storage subsystem 20, in accordance with an embodiment of the invention. The particular subsystem (also referred to herein as a storage system) shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host bus adapters (HBAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While such hardware is not explicitly shown for purposes of illustrative simplicity, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Storage devices 50 may comprise a combination of high capacity hard disk drives and solid state disk drives. In some embodiments each of storage devices 50 may comprise a logical storage device. In storage systems implementing the Small Computer System Interface (SCSI) protocol, the logical storage devices may be referred to as logical units, or LUNs. While each LUN can be addressed as a single logical unit, the LUN may comprise a combination of high capacity hard disk drives and/or solid state disk drives.

Examples of adapters 32 and 42 include switched fabric adapters such as Fibre Channel (FC) adapters, Internet Small Computer System Interface (iSCSI) adapters, Fibre Channel over Ethernet (FCoE) adapters and Infiniband™ adapters.

Figure 2:
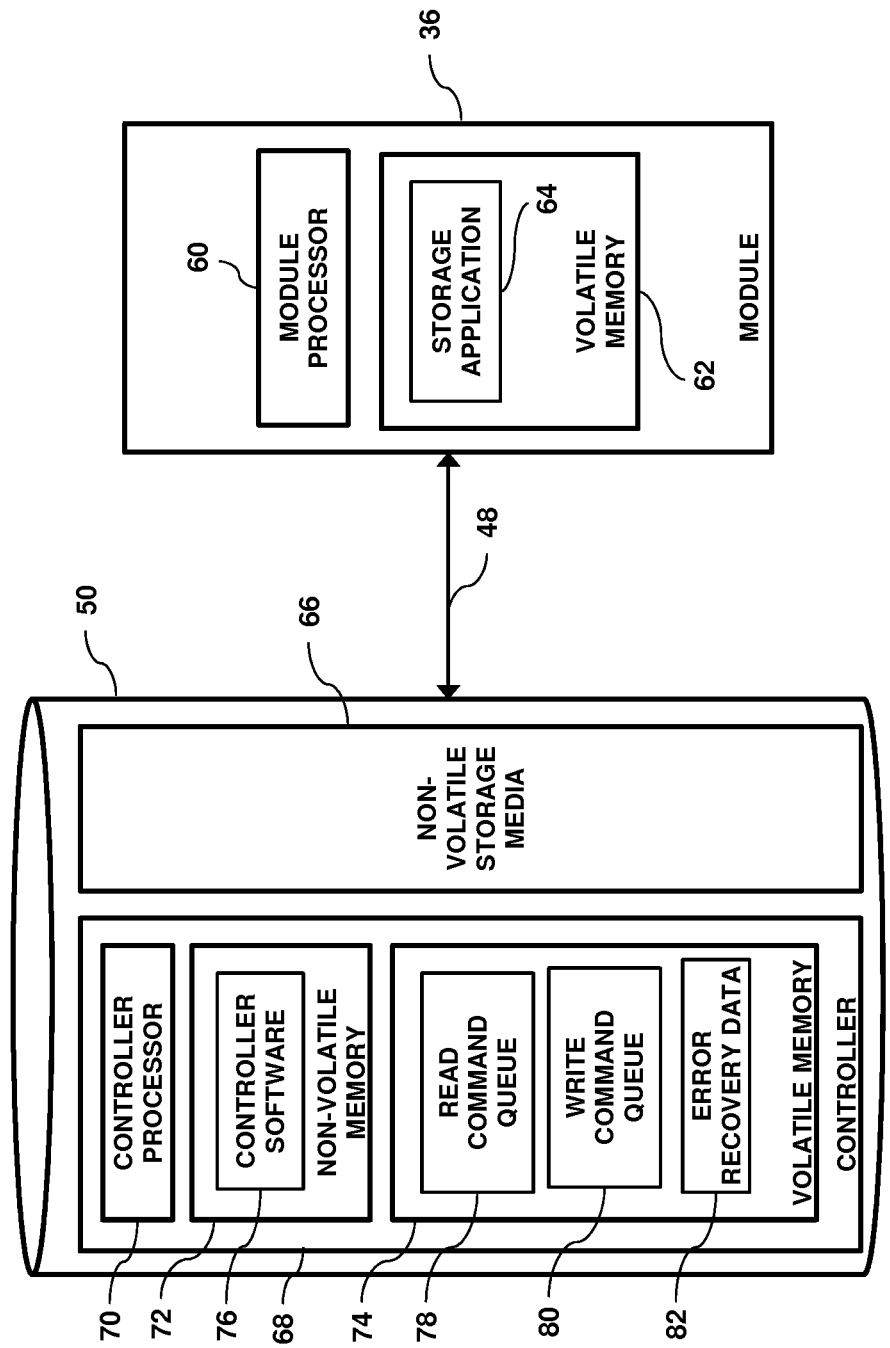
FIG. 2 is a block diagram of a module of the storage system coupled to a storage device configured to convey an error recovery status, in accordance with an embodiment of the present invention.

FIG. 2 is a block diagram of a given module 36 coupled to a given storage device 50 configured to convey an error recovery status, in accordance with an embodiment of the present invention. Module 36 comprises a module processor 60 (also referred to herein as a host processor) and a volatile memory 62. In operation, host processor 60 executes, from memory 62, a storage application 64 that is configured to convey input/output (I/O) requests to storage devices 50.

Storage device 50 comprises a non-volatile storage media 66 and a controller 68. Storage media 66 comprises non-volatile devices and/or materials configured to store data. Examples of storage media 66 include platters for a hard disk drive and non-volatile random access memory (NVRAM) modules for a solid state drive (SSD).

Controller 68 comprises a controller processor 70, a non-volatile memory 72 and a volatile memory 74. Controller processor 70 is configured to execute a controller application 76 from non-volatile memory 72 that enables module 36 to access (i.e., read/write) data on storage media 66 in order to process I/O requests received from module processor 60. In embodiments where storage device 50 comprises a hard disk, processor 70 executes controller application 76 to control motors (not shown) on the storage device, and to command disk heads (not shown) to read or write data.

Volatile memory 74 comprises a read command queue 78, a write command queue 80 and error recovery data 82. Upon receiving a read data request, controller processor 70 is configured to store the read data request to read command queue 78, and upon receiving a write data request, the controller processor is configured to store the write data request to write command queue 80. In operation, controller processor 70 is configured to retrieve read data requests from read command queue 78, retrieve the requested data from storage media 66, and convey the requested data to module processor 60. Likewise, controller processor 70 is configured to retrieve write data requests from write command queue 80, store the write request data to storage media 66, and convey a write completion acknowledgement to module processor 60.

Controller processor 70 is also configured to perform error recovery operations on storage media 66. For example, if storage device 50 comprises a disk drive comprising an analog/digital (A/D) converter coupled to a disk head having a magnetoresistive (MR) element, then examples of error recovery operations that controller processor 70 can perform include, but are not limited to:

Changing an automatic gain control of the A/D converter.
Positioning the disk head off-track in order to read data.
Adjusting a bias value of the MR element.

While controller processor 70 is performing a given error recovery operation, storage device 50 is considered to be in an error recovery mode. Additionally, upon completing a given error recovery operation, controller processor 70 can calculate a historical average completion time for the given error recovery operation, and store a historical average completion time to error recovery data 82.

In operation, upon detecting a problem such as adjacent track interference, controller processor 70 can perform one or more error recovery operations in order to resolve the problem. In embodiments described herein, controller processor 70 can coordinate execution of the one or more error recovery operations with module processor 60. For example, if storage device 50 comprises a SCSI storage device, examples of interactions between module processor 60 and controller processor 70 include, but are not limited to:

Upon receiving an I/O request from module processor 60, controller processor 70 can convey a Check Condition message indicating that storage device 50 is in an error recovery mode that comprises one or more error recovery operations.

Once module processor 60 detects that storage device 50 is in an error recovery mode, the module processor can convey a Request Sense command to controller processor 70, and the controller processor can responsively convey a message identifying the error recovery operation currently being performed on the storage device.

Module processor 60 can convey an Abort Task command to controller processor 70 to cancel execution of an error recovery operation currently being performed on storage device 50.

Subsequent to module processor 60 detecting that storage device 50 is in an error recovery mode, module processor 60 can convey an Inquiry command to controller processor 70 requesting the controller processor to identify the one or more error recovery operations that are scheduled to be performed while storage device 50 is in error recovery mode.

As described supra, controller processor 70 can store an average completion time for each error recovery operation to error recovery data 82. Controller processor 70 can store error recovery data 82 to a SCSI mode page (not shown), and module processor 60 can query the SCSI mode page for an average completion time of a given error recovery operation.

As described supra, controller processor 70 may perform several error recovery operations while storage device 50 is in an error recovery mode. Upon receiving a message indicating that storage device 50 is in an error recovery mode, module processor 60 can send a Mode Page Set command to define either which error recovery operations to perform or which scheduled error recovery operations to cancel.

Therefore, error recovery status information that controller processor 70 can convey to module processor 60 includes, but is not limited to, an identification of an error recovery operation currently executing on the controller processor, an identification of one or more additional error recovery operations scheduled for execution, and a historical average completion time for a given error recovery operation.

Processors 60 and 70 typically comprise general-purpose central processing units (CPU), which are programmed in software to carry out the functions described herein. The software may be downloaded to module 36, controller 68 and module 36 in electronic form, over a network, for example, or it may be provided on non-transitory tangible media, such as optical, magnetic or electronic memory media. Alternatively, some or all of the functions of processors 60 and 70 may be carried out by dedicated or programmable digital hardware components, or using a combination of hardware and software elements.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

ERROR RECOVERY MODE

Figure 3:
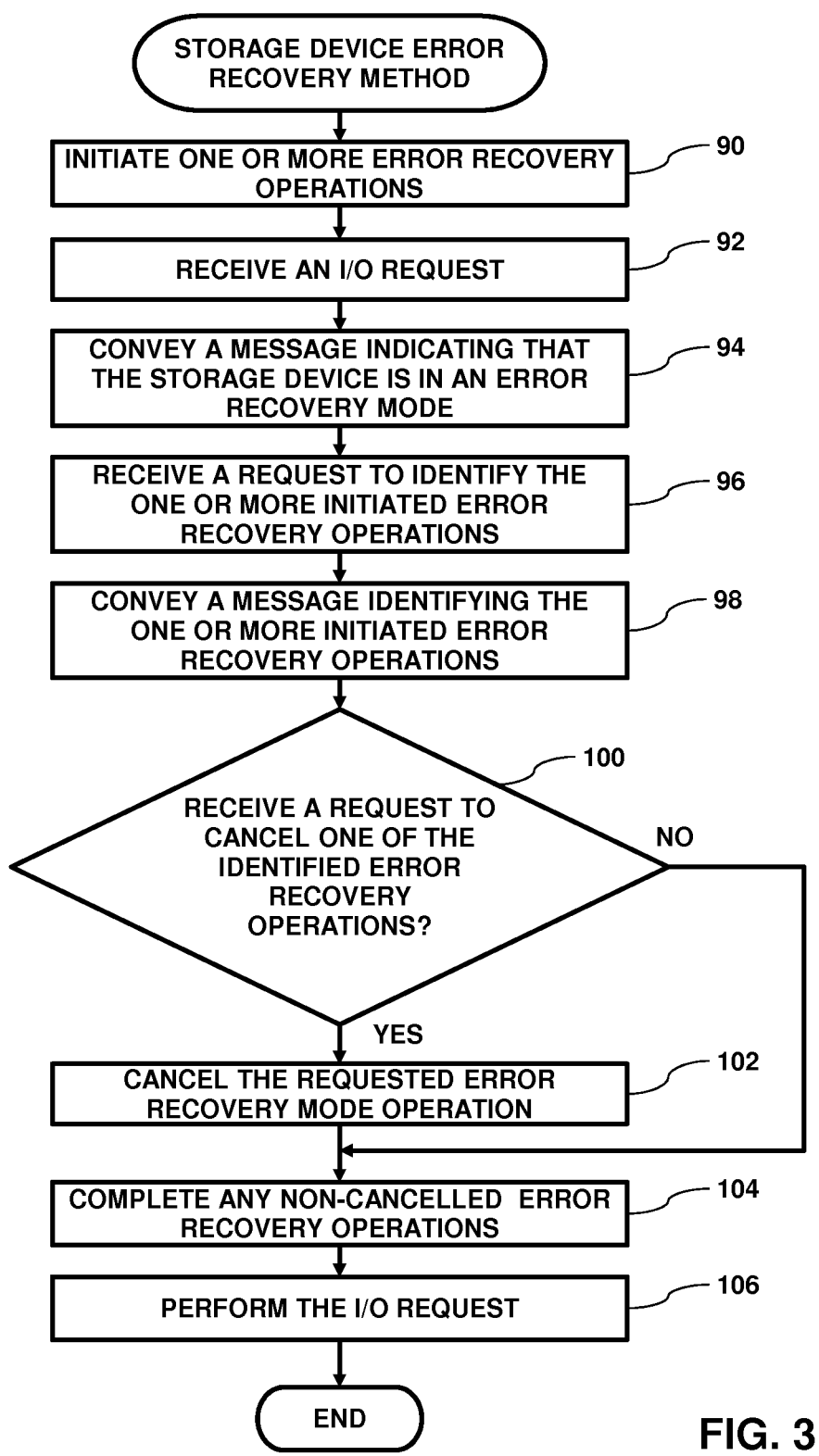
FIG. 3 is a flow diagram that schematically illustrates a method of performing one or more error recovery operations for the storage device, in accordance with an embodiment of the present invention.

FIG. 3 is a flow diagram that schematically illustrates a method for storage device 50 to perform one or more error recovery operations in accordance with an embodiment of the present invention. In an initial step 90, in response to detecting a problem in storage device 50, controller processor 70 starts executing a series of one or more error recovery operations, thereby placing the storage device in an error recovery mode.

In a first receive step 92, controller processor 70 receives an I/O request from module processor 60. Examples of I/O requests include, but are not limited to requests to read data from storage media 66 and requests to write data to the storage media. In a first convey step 94, controller processor 70 stores the I/O request to either read command queue 78 or write command queue 80, and conveys, to module processor 60, a message indicating that the storage device is in an error recovery mode.

In a second receive step 96, controller processor 70 receives, from module processor 60, a request to identify the one or more initiated error recovery operations that the controller processor is scheduled to perform while storage device 50 is in the error recovery mode. In a second convey step 98, controller processor 70 responds to the request by conveying, to module processor 60, a message identifying the one or more error recovery operations that the controller processor is scheduled to perform while storage device 50 is in the error recovery mode.

In a first comparison step 100, if controller processor 70 receives a subsequent request from module processor 60 to cancel one of the one or more identified error recovery operations, then in a cancellation step 102, the controller processor cancels the one of the one or more identified error recovery operations in response to the subsequent request.

The one of the one or more identified error recovery operations may comprise a first error recovery operation currently executing on controller processor 70 or a second error recovery operation scheduled to be executed by the controller processor. As described supra, while storage device is in an error recovery mode, controller processor may perform multiple error recovery operations. In operation, controller processor 70 can use an execution queue (not shown) to schedule execution of the multiple error recovery operations. Therefore, if the second error recovery operation in the execution queue matches the one of the one or more identified error recovery operations, then the controller processor can remove the second error recovery operation from the execution queue.

In a completion step 104, controller processor 70 completes execution of any non-cancelled error recovery operations, thereby enabling storage device 59 to exit the error recovery mode. Finally, in a perform step 106, controller processor 70 performs the I/O request received in step 92, and the method ends. Returning to step 100, if controller processor 70 does not receive a request from module processor 60 to cancel any of the identified error recovery operations, then the method continues with step 104.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

The invention claimed is:

1. A storage device, comprising:
   storage media configured to store data; and
   a hardware controller having a controller processor configured:
      to perform one or more error recovery operations on the storage media,
      to convey, while performing the one or more error recovery operations, a message indicating a status of the one or more error recovery operations to a host processor in communication with the storage device;
      the storage device comprising a disk head having a magnetoresistive (MR) element configured to read and write data to and from the storage media, and coupled to an analog/digital (A/D) converter, and wherein the one or more error recovery operations are selected from a list comprising changing an automatic gain control of the A/D converter, positioning the disk head off-track in order to read the data, and adjusting a bias value of the MR element, and
      to receive, from the host processor, a request to identify the one or more error recovery operations, to convey, in response to receiving the request, a message to the host processor identifying the one or more error recovery operations, to receive, from the host processor, a subsequent request to cancel one of the one or more identified error recovery operations, and to cancel execution of the one of the one or more identified error recovery operations in response to the subsequent request.

2. The storage device according to claim 1, wherein the storage device is selected from a list comprising a hard disk drive and a solid state disk drive.

3. The storage device according to claim 1, wherein the controller processor is configured to convey the message in response to receiving an input/output (I/O) request from the host processor.

4. The storage device according to claim 3, wherein the I/O request is selected from a list comprising a read data request and a write data request.

5. The storage device according to claim 1, wherein the controller processor is configured to convey the message by broadcasting the message to the host processor upon the controller processor initiating the one or more error recovery operations.

6. The storage device according to claim 1, wherein the one of the one or more identified error recovery operations is selected from a list comprising a first error recovery operation currently executing on the controller processor and a second error recovery operation scheduled to be executed by the controller processor.

7. A method, comprising:
   performing, by a storage device having storage media, one or more error recovery operations on the storage media;
   conveying, while performing the one or more error recovery operations, a message indicating a status of the one or more error recovery operations to a host processor in communication with the storage device;
   the storage device comprising a disk head having a magnetoresistive (MR) element configured to read and write data to and from the storage media, and coupled to an analog/digital (A/D) converter, and wherein the one or more error recovery operations are selected from a list comprising changing an automatic gain control of the A/D converter, positioning the disk head off-track in order to read the data, and adjusting a bias value of the MR element; and
   receiving, from the host processor, a request to identify the one or more error recovery operations, conveying, in response to the request, a message to the host processor identifying the one or more error recovery operations, receiving, from the host processor, a subsequent request to cancel one of the one or more identified error recovery operations, and canceling execution of the one of the one or more error identified recovery operations in response to the subsequent request.

8. The method according to claim 7, wherein the storage device is selected from a list comprising a hard disk drive and a solid state disk drive.

9. The method according to claim 7, and comprising receiving an input/output (I/O) request from the host processor, and conveying the message in response to the I/O request.

10. The method according to claim 9, wherein the I/O request is selected from a list comprising a read data request and a write data request.

11. The method according to claim 7, wherein conveying the message comprises broadcasting the message to the host processor upon the controller processor initiating the one or more error recovery operations.

12. The method according to claim 7, wherein the one of the one or more identified error recovery operations is selected from a list comprising a first error recovery operation currently being executed by the storage device and a second error recovery operation scheduled to be executed by the storage device.

13. A computer program product, the computer program product comprising:
 a non-transitory computer readable storage medium having computer readable program code embodied therewith, the computer readable program code comprising:
 computer readable program code configured to perform, by a storage device having storage media, one or more error recovery operations on the storage media;
 computer readable program code configured to convey, while performing the one or more error recovery operations, a message indicating a status of the one or more error recovery operations to a host processor in communication with the storage device;
 the storage device comprising a disk head having a magnetoresistive (MR) element configured to read and write data to and from the storage media, and coupled to an analog/digital (A/D) converter, and wherein the one or more error recovery operations are selected from a list comprising changing an automatic gain control of the A/D converter, positioning the disk head off-track in order to read the data, and adjusting a bias value of the MR element; and
 computer readable program code configured to receive, from the host processor, a request to identify the one or more error recovery operations, to convey a message to the host processor identifying the one or more error recovery operations, to receive, from the host processor, a subsequent request to cancel one of the one or more identified error recovery operations, and to cancel execution of the one of the one or more identified error recovery operations in response to the subsequent request.

14. The computer program product according to claim 13, and comprising computer readable program code configured to receive an input/output (I/O) request from the host processor, and to convey the message in response to the I/O request.

15. The computer program product according to claim 13, wherein the computer readable program code is configured to convey the message by broadcasting the message to the host processor upon the controller processor initiating the one or more error recovery operations.

\* \* \* \* \*